US005105306A

United States Patent [19]

Ohala

[11] Patent Number: 5,105,306

[45] Date of Patent: Apr. 14, 1992

[54] VISUAL EFFECT CREATED BY AN ARRAY OF REFLECTIVE FACETS WITH CONTROLLED SLOPES

[76] Inventor: John J. Ohala, 1149 Hillview Rd., Berkeley, Calif. 94708

[21] Appl. No.: 298,636

[22] Filed: Jan. 18, 1989

[51] Int. Cl.[5] .............................................. G02B 27/22

[52] U.S. Cl. .................................... 359/478; 359/619; 359/627

[58] Field of Search ............... 350/144, 452, 130, 613, 350/167, 451; 434/96; 353/10; 40/160; 156/58, 59

[56] References Cited

U.S. PATENT DOCUMENTS

| | | | |
|---|---|---|---|
| 725,567 | 4/1903 | Ives | 350/131 |
| 1,150,374 | 8/1915 | Kaholt | 350/167 |
| 1,422,527 | 7/1922 | Berger | 350/132 |
| 1,858,975 | 5/1932 | Ta'Bois | 40/582 |
| 1,879,793 | 9/1932 | Chubb | 352/62 |
| 1,993,448 | 3/1935 | Huber | 350/115 |
| 2,140,702 | 12/1938 | Kanolt | 350/131 |
| 2,149,171 | 2/1939 | Grote | 40/135 |
| 2,268,351 | 12/1941 | Tanaka | 350/128 |
| 2,499,452 | 3/1950 | Bonnet | 350/167 |
| 2,522,812 | 9/1950 | Bonnet | 350/131 |
| 2,888,855 | 6/1959 | Tanaka | 350/144 |
| 3,101,644 | 8/1963 | Lopez-Henriquez | 352/86 |
| 3,357,770 | 12/1967 | Clay | 350/131 |
| 3,439,972 | 4/1969 | Ratliff, Jr. | 350/131 |
| 3,520,588 | 7/1970 | Satyer et al. | 350/132 |
| 3,532,411 | 10/1970 | Richards | 350/34 |
| 3,663,085 | 5/1972 | Davis | 350/132 |
| 3,708,222 | 1/1973 | Stern | 350/452 |
| 3,744,391 | 7/1973 | Plummer | 350/452 |
| 4,402,571 | 9/1983 | Cowan et al. | 350/162.17 |
| 4,717,221 | 1/1988 | McGrew | 350/162.18 |
| 4,725,111 | 2/1988 | Weitzen et al. | 350/3.6 |
| 4,725,511 | 2/1988 | Reber | 350/162.18 |
| 4,737,448 | 4/1988 | Hochberg | 350/162.23 |

OTHER PUBLICATIONS

Duffie, J. A. and Beckman, W. A., *Solar Energy Thermal Process*, Wiley (1974), pp. 182-185.

McDaniels, D. K. *The Sun: Our Future Energy Source*, Wiley (1979), pp. 222-225.

Burdett, E., *The Craft of Bookbinding*, Pittman Pub. Co., (1975), plates 4+5.

Sample Greeting Card, Manifestations, Inc.

Smith, P., *New Directions in Bookbinding*, VanNostrand Pub., (1974), p. 105.

Jenkins, L. and Mills, B., *The Art of Making Mosaics*, D. VanNostrand Co., Inc., (1957), pp. 37, 48-49.

L'Orange, H. P. and Nordhagen, P. J., *Mosaics*, Methuen and Co., Ltd., (1966) pp. 8-11, 46-49, 56-57.

Rock, I, *Perception*, Scientific American Books, Inc., N.Y., (1984) pp. 58-60.

Thorp, K. O. *Motion Pictures in Relief*, Bell Lab. Record, vol. 10, No. 10, Jun. 1932.

"Holography" *The New Encyclopaedia Britannica*, vol. 25, pp. 215-216, 15th Ed.

Montgomery, F. M., *Textiles in America* 1650-1870, pp. 195,347, 1984.

Offenhartz, H. *Point-of-Purchase Design, pp. 186-187, 1968.*

*Primary Examiner*—Bruce Y. Arnold
*Assistant Examiner*—David R. Parsons
*Attorney, Agent, or Firm*—Heller, Ehrman, White & McAuliffe

[57] ABSTRACT

A visual effect comprising an array of sections formed in a surface. The sections have a facet and a reflective medium is formed on the facets. The facets are sloped in a predetermined way to correspond to sections in a real or imagined three-dimensional scene to create an image that simulates the scene.

39 Claims, 8 Drawing Sheets

MODEL SCENE

REPLICA SCENE

SUNKEN

RAISED

ANGLED DIRECTION OF TOOL IMPRESSION;
TOOL HAS FLAT FACE

90° DIRECTION OF TOOL IMPRESSION;
TOOL HAS ANGLED FACE

VISUAL EFFECT CREATED BY AN ARRAY OF REFLECTIVE FACETS WITH CONTROLLED SLOPES

BACKGROUND OF THE INVENTION

This invention relates generally to the creation of visual effects, and more particularly to a three-dimensional image or "shot silk" effect created by an array of reflective facets with controlled slopes.

We live in a three dimensional world but for practical reasons choose to represent it primarily on two dimensional surfaces. Since the cave wall paintings made in prehistoric times man has tried to find ways to approximate three dimensions in two dimensional representations. Shading, perspective, and many other purely graphical techniques are early examples of these efforts. Stereopticons, 3-D photography, and holograms are more modern examples.

Viewers construct three-dimensional visual percepts from the two-dimensional image of the world projected onto the retina using many different cues: perspective, interposition, shadows, etc. (Rock, Irvin, 1975. An introduction to perception, New York: Macmillan). Several of the techniques which create the illusion of three dimensions in two-dimensional representations exploit the "parallax" cue, that is, the fact that when looking at a three-dimensional scene we see a slightly different view from the right and left eyes. (This is the so-called "binocular disparity"). Examples are stereopticons and 3-D photography which presents different scenes to the two eyes by various means. The parallax cue can also function monocularly (and does so for one-eyed individuals) if a different view is seen when the observer looks at the representation from a different angle as is possible, for example, with modern holograms.

The present invention exploits the parallax cues obtained from reflections or highlights, i.e., that in a three-dimensional scene the point within the scene from which a given incident light ray is reflected is different depending on the angle at which the scene is viewed. The viewer's experientially-based knowledge of how to reconstruct shapes from such reflections undoubtedly also comes into play to enhance the illusion.

SUMMARY OF THE INVENTION

As may be seen hereinafter, this invention concerns a technique for creating on a smooth surface an illusion of low-relief three-dimensional images by means of an array of small highly reflective surface segments, the angles of reflection of which are varied in controlled ways. The technique may also be used to create additional visual effects, for example, a "shot silk" effect, that is, where the color of a surface changes depending on the angle at which it is viewed.

The present invention is directed to a visual effect and a method for creating a visual effect. The visual effect may comprise an array of sections formed in a substantially flat or curved surface. The sections have a facet and a reflective medium is formed on the facets. The facets are sloped in a predetermined way to correspond to sections in a real or imagined three-dimensional scene to create an image that simulates the scene.

BRIEF DESCRIPTION OF THE DRAWINGS

The present invention will be described in more detail in conjunction with the drawings wherein.

DESCRIPTION OF THE PREFERRED EMBODIMENTS

Figure 1:
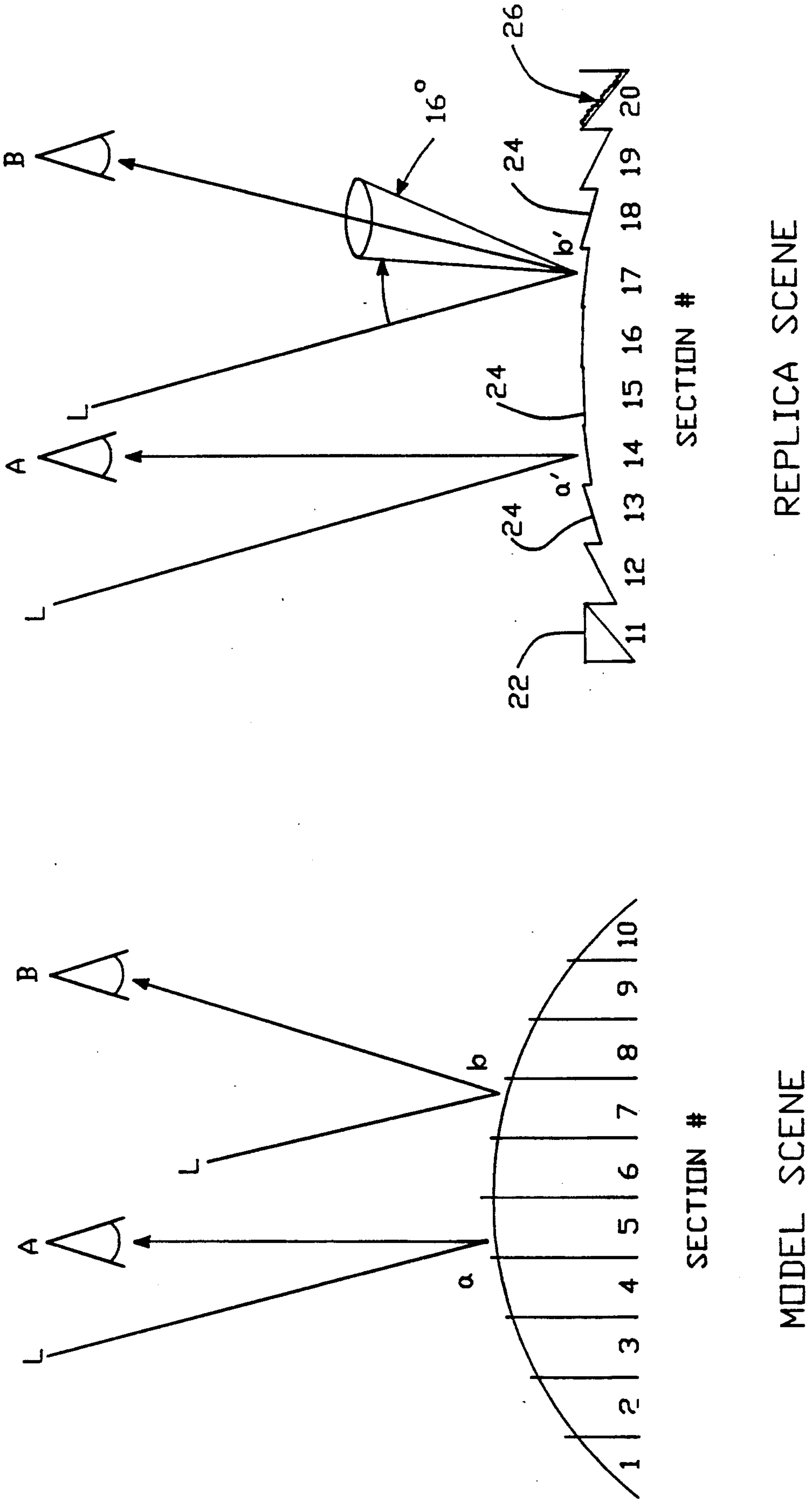
FIG. 1 is a schematic diagram that illustrates the present invention.

To simplify the exposition, the technique is described first as it would apply to flat ("planar") surfaces; a straightforward extension to non-planar surfaces will be discussed later. The technique of the present invention can be reduced to the following steps. First, as shown in FIG. 1, the surface of a scene to be simulated (the "model scene"), which may be real or imagined, is partitioned into a two-dimensional array of small non-overlapping sections 1–10, and the slope of each of these sections determined. Then an array of like-sized sections 11–20 is created on an appropriate flat surface, referred to as the "base" 22, such that each section has the same slope and the same position in the two dimensions as the corresponding section in the model scene. This is referred to as the "replica scene". Note that the elevations of the original sections are not preserved; all sections of the replica scene lie in a thin plane whose thickness or depth is equal to the elevation of the maximal slope retained from a section of the model scene. The sections should be small enough so that rather than copying any detailed contours in the surface of the individual sections in the model scene, it is sufficient to imitate their average slopes using flat surfaces. In the replica scene these flat approximations to the slopes of the sections in the model scene are referred to as "faces" or "facets" 24. When these facets are made highly reflective (by polishing or by application of a reflective medium, metallic foil 26) the ensemble of the sections in the replica scene will reflect ambient light in much the same way as the model scene (were its surface also made highly reflective) and thus create an illusion of three dimensions. In both cases, incident light L is reflected from a different portion (section) of the scene, a or b, or a′ or b′, when viewed from a different position by observers A or B.

In the present invention the slopes of the segments 11–20 are controlled so as to scatter light in a way which reproduces the light scattering of highly-reflective, low-relief, three-dimensional scenes.

Figure 2A:
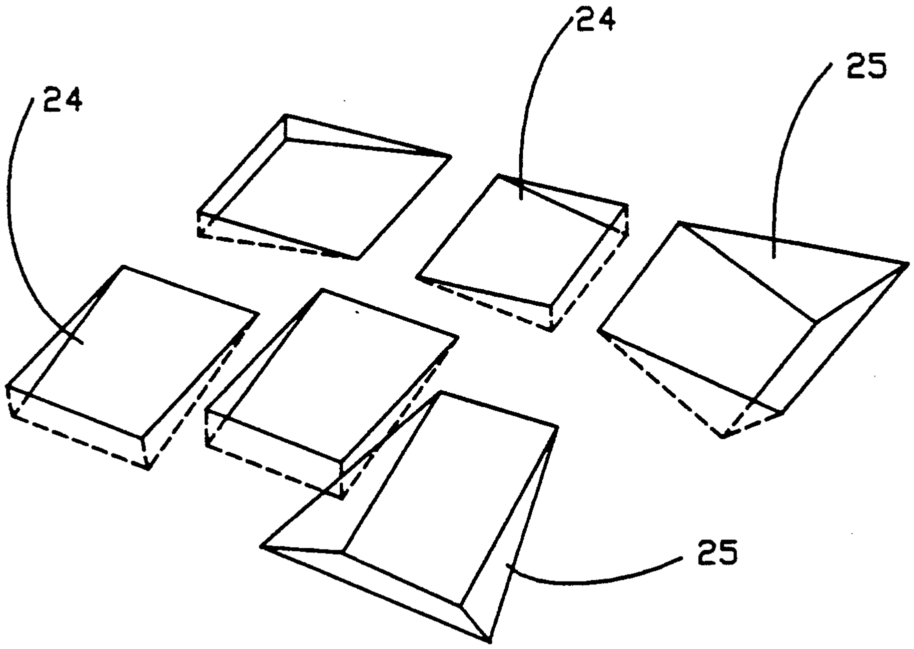
FIGS. 2A and 2B schematically illustrate the sunken and raised facets, respectively.
Figure 2B:
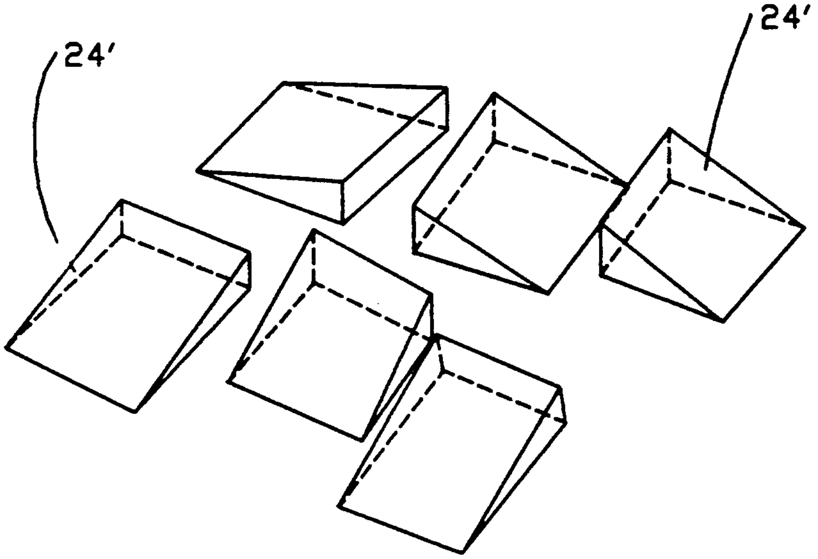

As illustrated in FIGS. 2A and 2B, depending on the method of implementation, the facets 24 in the array may be sunken (impressed into base) with respect to the base or the facets 24′ may be raised (on top of base) or both; that is, both raised and sunken facets may be used in a single array or facets may have their low end sunken and high end raised.

The sections do not have to be equal in area nor do they all have to be the same shape. Circles, squares, hexagons, rectangles, stripes, etc. may be used uniformly or mixed in order to achieve the desired effect in the most efficient or aesthetically pleasing way. In some cases there may be advantages of circular sections over those with straight edges; as discussed below.

Limits on the maximum diameters of the sections would be a function of three factors. It should be understood here that "diameter" in the case of rectangular or stripe-like sections refers to width. First, they should appear small to the viewer in order not to distract from or cause the perceptual disintegration of the overall replica scene. In short, the size of the sections can be said to be governed by the same constraints that apply in the choice of screen coarseness in halftone reproduction as well as in mosaics and "pointillist" paintings. Thus "small" for replica scenes viewed at normal reading distance (about 50 cm.) would probably mean diameters no larger than 1 mm or so whereas "small" for wall-sized scenes viewed at distances of several meters could mean diameters that were considerably larger. Second, the sections should be small enough to resolve the smallest detail from the model scene that one desires to imitate in the replica scene. Third, in the event that the facets in the replica scene are impressed into a surface (as in printing or stamping, see below) then the diameters of the sections should be small enough so that the deepest impression made (for the steepest slope) does not structurally weaken the material taking the impression.

Minimum diameters would be more a function of the method of implementation and not the invention itself, with the exception, perhaps, that the facets should not become so small and so regularly spaced that the array functions as a diffraction grating and thus separates incident light rays into different wavelengths or colors.

The facets may all have the same reflective properties or they may be different; different colors may be mixed —again, depending on the aesthetic effect desired. However, the high reflectivity of the facets is required in order to reduce scattering of incident light rays on a given facet. That is, the angle at which light is reflected should be relatively narrow and thus detected only at a specific viewing angle. A light scattering "cone" 16 degrees or less in diameter is acceptable (see FIG. 1). Or in other words, diffusion or scattering of the light which deviates up to approximately 8 degrees from the ideal angle of reflection (equal to the angle of incidence) is acceptable. However, extremely reflective surfaces with minimal light scattering, that is, mirror-like surfaces, offer special problems discussed below. Thus, as required to reproduce parallax effects, a given reflection will occur only with a change in viewing position with respect to the replica scene. Experience with the technique shows that the reflectivity of ordinary metallic foil such as is used in book cover decoration and machine stamping achieves the desired effect very well.

The base must be semi-rigid in order to maintain the relative slopes of the sections in the replica scene. Chipboard, bristol board, stiff card stock, with or without an outer layer of paper, cloth, leather, etc. are suitable base material; other stiff base material, e.g., wood, plastic, metal, cement, etc., would serve as well.

In general, the images simulated can only represent low-relief scenes since the maximum slope that can be employed on a section of the replica scene is about 45 degrees or less with respect to the base. This is so for the following reasons. The illusion of depth from this technique requires that light be reflected to the viewer from some fraction of the facets in the replica scene at any viewing angle. Assuming a typical viewing angle which is normal (90 degrees) to the base, the minimum incident angle for a light ray which would still reach the viewer would be 90 degrees (with respect to normal, that is parallel to the surface of the base) and would have to impinge on a facet with a slope of 45 degrees with respect to the base. In the case of facets sunken or impressed into the base (or raised facets which are in the shadow of other facets), the minimum incident angle would have to be less than 90 degrees and then the maximum slope of the facet would also have to be less than 45 degrees with respect to the base.

This constraint can be overcome to a limited extent by adopting a viewing angle of less than 90 degrees with respect to the base. In fact, when such replica scenes are imprinted on objects one can hold in the hand, the illusion of depth is much enhanced by varying the viewing angle continuously by changing the angle of the base, that is, by pivoting it around various axes.

Figure 3A:
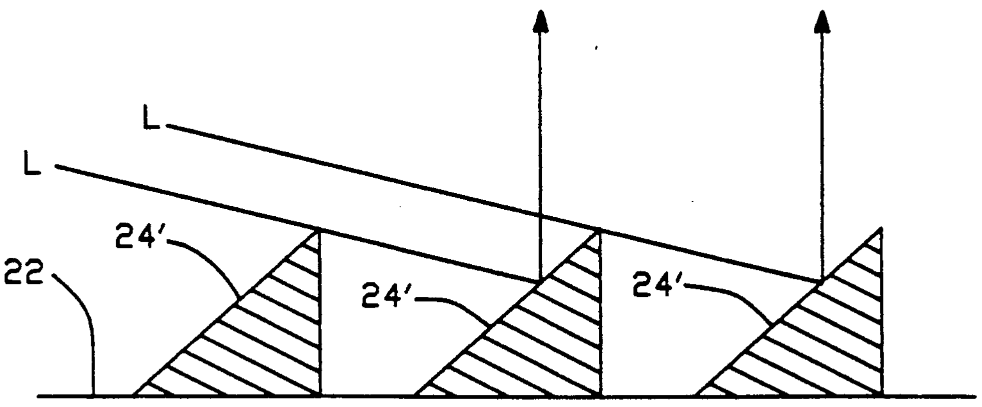
FIGS. 3A and 3B schematically illustrate ways of increasing the amount of light reflected by the facets.
Figure 3B:
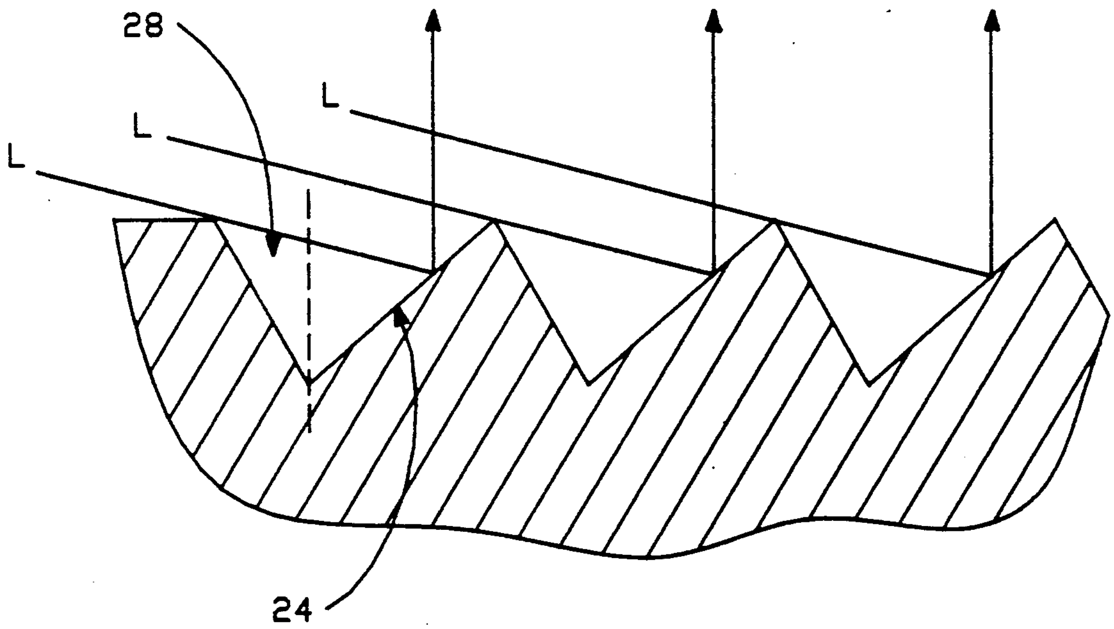

As mentioned in the preceding paragraphs, there are potential limitations on the angle of incident light which will reflect off the facets and reach the viewer. These limitations will affect the amount of light reflected at any angle, not only at the minimum angle. In the case of sunken facets or facets in the shadow of other facets, some light incident at 80 degrees (from normal), say, may reach a small portion of the facet but obviously not very much light will be reflected to the viewer since most of the facet will still be in shadow. To maximize the amount of light that can reach the facets in such cases it is desirable to leave a gap between raised facets 24' (FIG. 3A) and, in the case of sunken facets 24, to also have an aperture 28 (FIG. 3B) cut into the walls of the impression. Although this will decrease the density of the sections and thus the points of reflection from the replica scene (which are necessary to the overall illusion), it will permit more efficient reflection from the remaining facets. Experience suggests that gaps equal approximately to the diameter of the facets themselves does not diminish the effectiveness of the illusion.

These gaps between raised facets and windows, discussed below, to sunken facets also solve another potential problem that arises if the reflective surface on the facet has such high reflectivity (minimal light scattering from the surface) that it becomes mirror-like. In these cases the surfaces will reflect to the viewer not only incident light but also details of the projections bearing neighboring facets (in the case of raised facets) or details of the walls of the impression (in the case of sunken facets). Such details, of course, are inconsistent with a three-dimensional scene and thus detract from the illusion of depth. Separating the raised facets and creating windows 25, as shown in FIG. 2A, around the sunken facets reduces the distraction from the reflection of such details when mirror-like reflective surfaces are used on the facets.

In the case of sunken facets but depending on the method of implementation, it may be difficult to prevent some of the reflective coating from adhering to the walls of the impression; that is, the walls other than the facet surface 24. In this case there is an advantage to section shapes that do not have straight edges such as squares, hexagons, etc. In these latter cases these reflective walls will also reflect light narrowly at unintended angles and thus detract from the impression aimed at. Then sections with curved walls (circles, ovals, etc.) would be optimal. Although these curved walls would also reflect light at unintended angles it would be scattered over diverse angles and would be less likely to interfere with the intended effect.

The illusion created by the present invention requires that sufficient light reflects off the facets towards the viewer. Experience shows that relatively low light levels to average light levels are more conducive to the illusion than is extremely bright light. It is also less effective when light strikes the replica scene at angles which fail to reflect off a sufficient number of the facets towards the viewer. Light from multiple sources impinging on the replica scene may also give a confusing impression and detract from the illusion.

The illusion is also enhanced if there is considerable redundancy in the image—so that the viewer can predict the shape in regions which (at certain angles of viewing) do not reflect light to the viewer. This is achieved with geometrical figures of regular, especially symmetric, structure and with familiar images (e.g., faces, buildings, animals, etc.).

A straightforward extension of the invention as described so far would be the implementation of the array of facets with controlled angles on a surface which is not flat. Thus, the invention may be implemented on a curved surface as well. In this case the effect would be that of illusory depth in the dimension normal to the base. As discussed below, the invention can be implemented in a variety of ways.

Figure 4A:
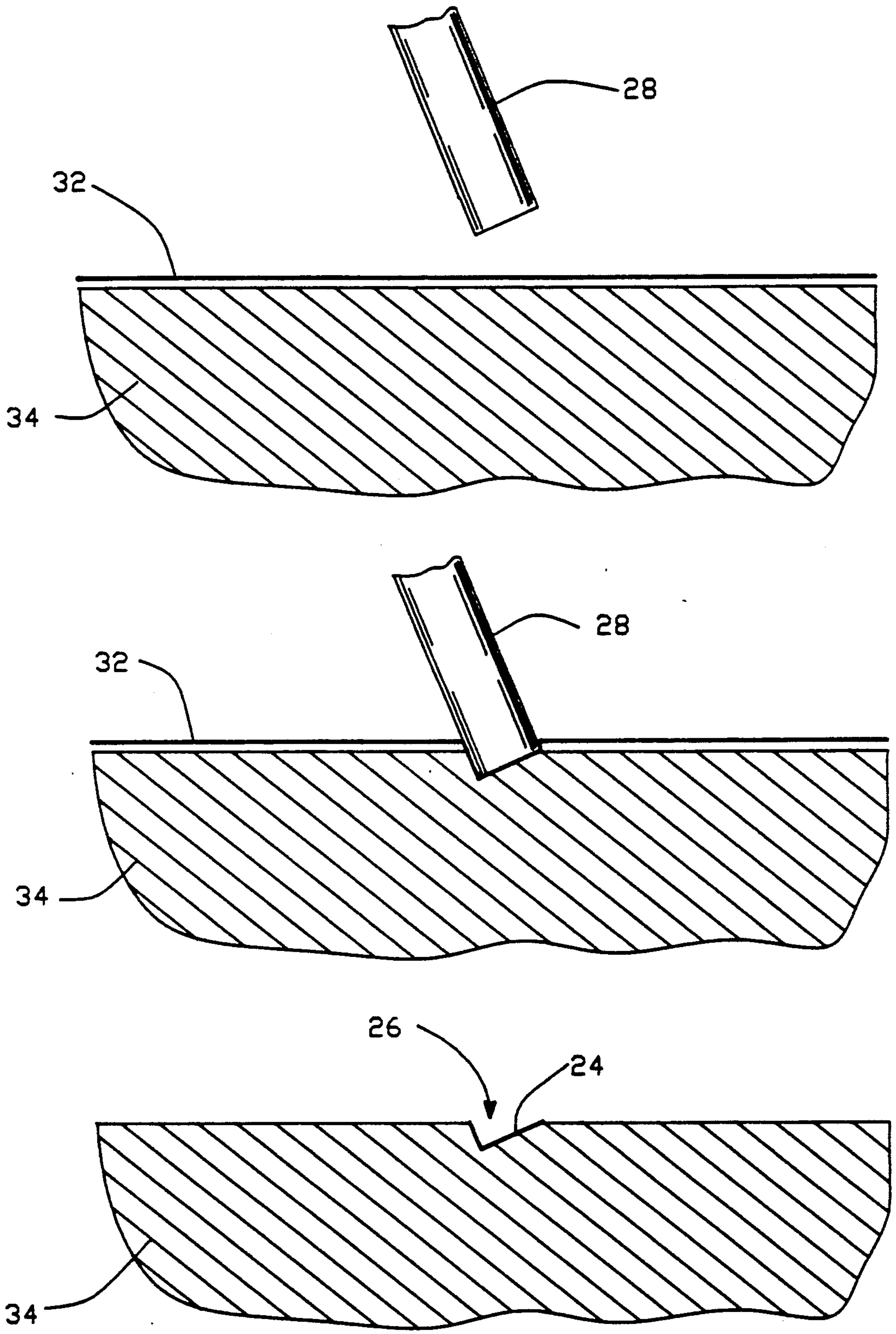
FIGS. 4A and 4B schematically illustrate ways in which the present invention may be implemented.

1. In hand bookbinding, one method by which covers are decorated and titled involves using heated hand tools with different face shapes to impress adhesive-backed metallic foil onto a reinforced cloth or leather surface. The creation of the necessary slanting impression (plus the aperture, mentioned above, which permits more light to reach the facet) and the application of the reflective coating may thus be accomplished in one step. This involves altering normal practice in bookbinding—which requires the impression to be parallel to the tooled surface—and making the impression at the appropriate angle instead. As shown in FIG. 4A, a tool 30 may be disposed at an angle to the adhesive-backed metal foil 32 and book surface 34 to create the necessary slanting impression that results in facet 24 with a reflective coating 26.

Figure 4B:
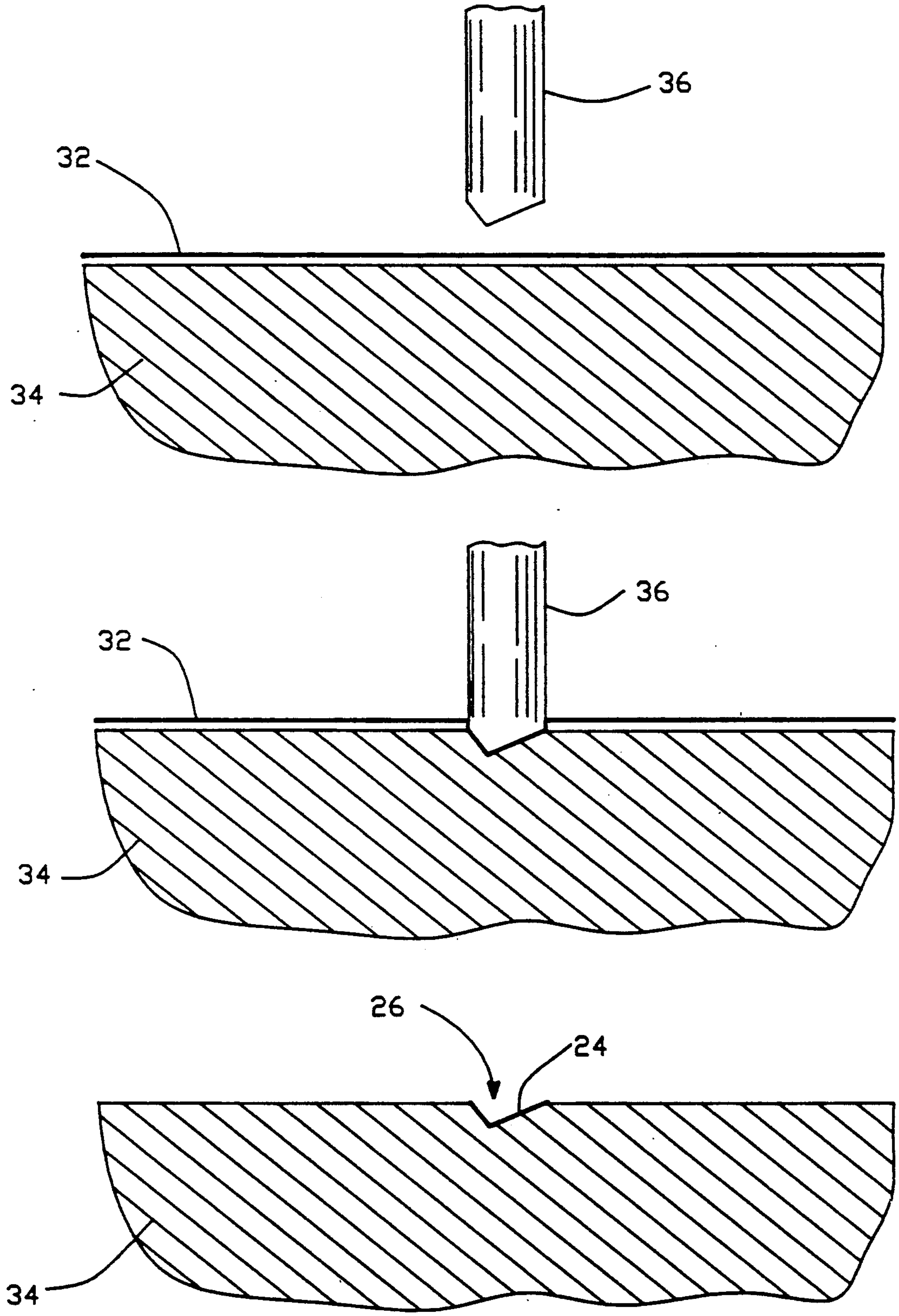

Another common method of decorating books with real gold leaf requires that the impression in the leather, the application of an adhesive, and the application of the gold leaf be done in separate steps but again, the only deviation from normal practice that would be required would be to make the impressions at the needed angle instead of making them uniformly parallel to the surface being decorated. (There are variants on this latter technique, too.) Alternatively, as shown in FIG. 4B, a tool 36 whose face is angled with respect to the book surface may be used.

Figure 5:
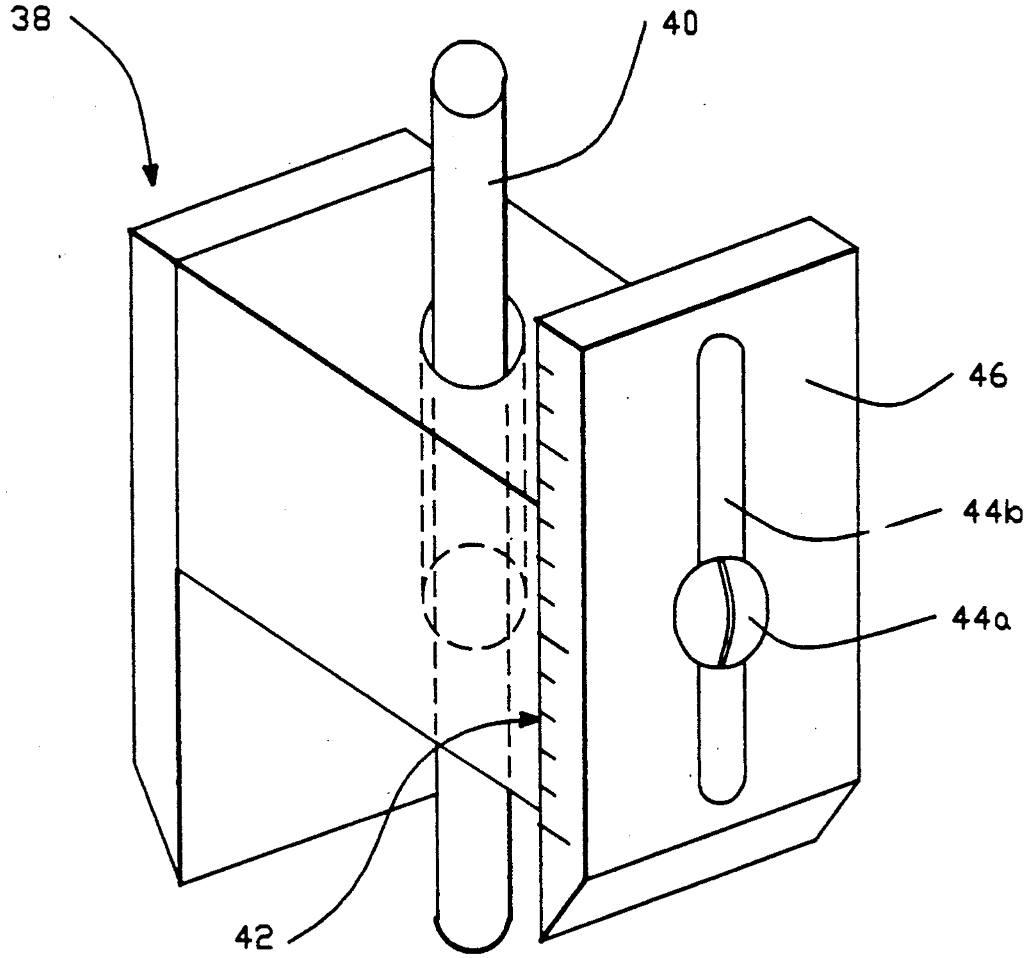
FIG. 5 schematically illustrates a jig for use in implementing the present invention.
Figure 6:
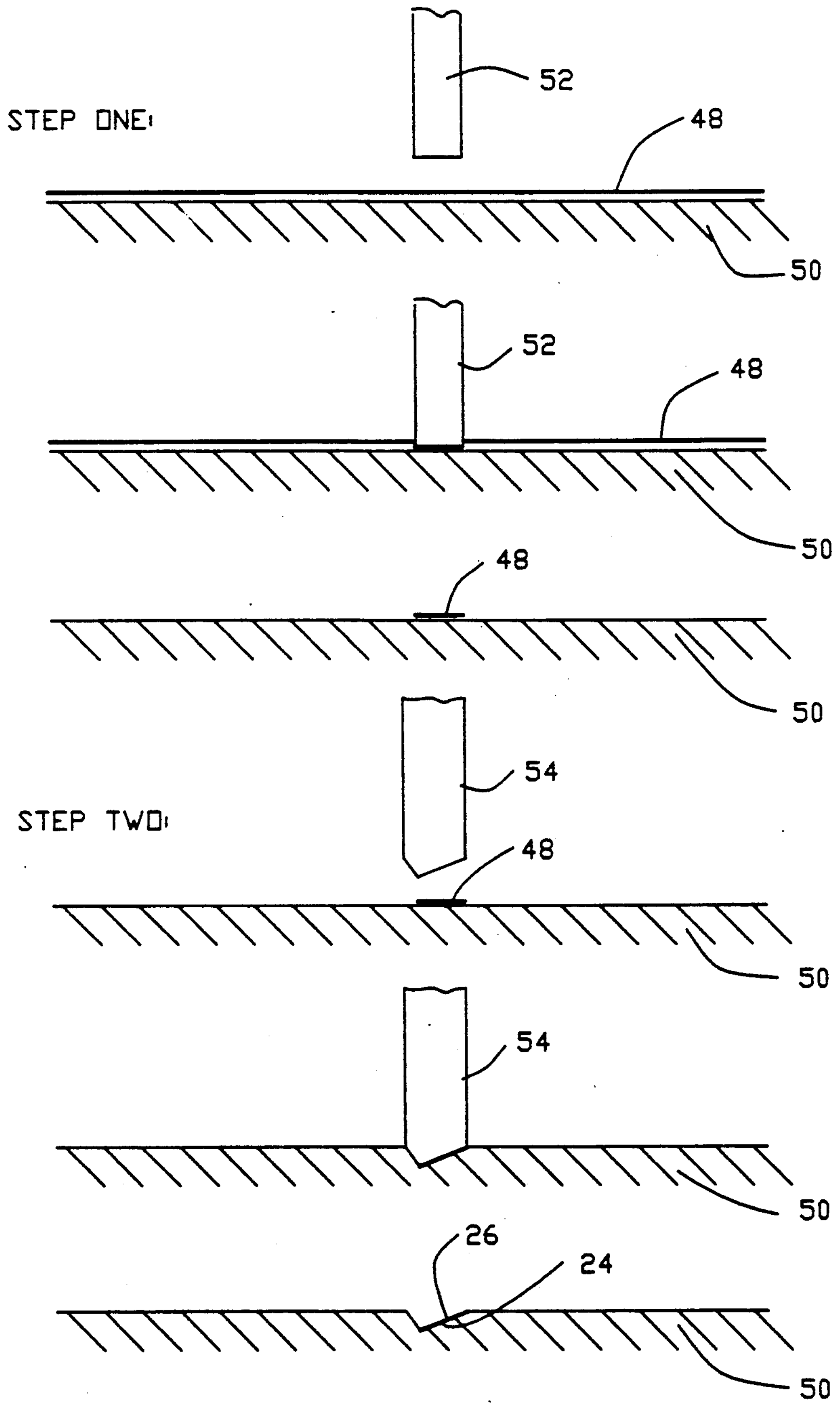
FIG. 6 schematically illustrates a method for implementing the present invention which is designed to prevent unwanted "runover" of the reflective medium.

For such a "hand" implementation some skill and judgment would be necessary to insure that the tool was impressed at the angle appropriate to the representation desired. However a simple "jig" 38, as shown in FIG. 5, for guiding the tool may be made. An appropriate tool 40 is held by the jig. An appropriate scale 42 can be included on the jig to calibrate the angle of the impression. A screw 44*a* disposed in a slot 44*b* permits the adjustment of one leg 46 of the jig. Thus, the angle at which the tool 0 is held with respect to the surface to be impressed may be varied.

2. Traditional letterpress printing or stamping can implement this technique if adapted to have plates which incorporate elements with slanting faces instead of the faces uniformly parallel to the surface on which the impression is made. Such plates could be created using a computer-controlled milling machine. Computer control may be desirable in any case since the task of determining the appropriate slopes of sections of a three dimensional scene would otherwise be difficult. Computer imaging techniques, however, would make the computer-aided design of low-relief images relatively easy and the computation of the slopes of small sections of the images a simple matter.

Another way of implementing the letterpress or stamping method may involve drilling closely-spaced holes in a plate of brass (or other metal)—a centimeter thick or so—and inserting into these holes short segments of brass wires whose ends have been cut at appropriate angles and polished. These polished, angled faces would have to project beyond the surface of the plate and, of course, the placement in a given hole of a wire with a particular angle has to be worked out in what amounts to painstaking detail beforehand in order to create the image desired. The wires may be fixed in the holes by solder. This plate, studded with the projecting wires, then can be utilized as indicated above. This method, however, is very labor intensive, and as such, is probably not commercially feasible.

3. A dot-matrix printer could implement the technique if adapted to make impacts with sufficient force to make an impression on the base, to take heavier paper or board, and to have heated striking pins (if normal adhesive-backed metallic foil is used).

4. The array may be constructed by joining together building blocks (e.g., mosaic elements, bricks, tiles, windows) which incorporate facets having the required slopes and reflective surfaces. This might be particularly appropriate for architectural decoration, i.e., where the low-relief image is part of a large surface such as a wall.

5. A variety of other standard techniques, singly or in combination, could be used to create the needed slanted facets and the imposition of a reflective surface to the facets, e.g., molding, casting, etching, polishing, electroplating, painting, vapor deposition. Any medium which is capable of regulating the angle at which incident light is reflected (e.g. something akin to liquid crystals, or reflective surfaces whose orientations and angles were controlled by stepping motors) could also implement this technique.

The methods described in paragraphs 1-3 above may be generically called "stamping". Any stamping method may, however, encounter the drawback mentioned above where some of the material constituting the reflective coating (typically metallic foil) may be applied to the walls of the impression or even to the space between the sections, both to the detriment of the effect desired. In these cases the following two step procedure, shown by FIG. 9, may prevent unwanted "run over" of the reflective medium: First the reflective medium 48 may be applied flat on the surface of the base in the desired shapes and locations by means of a first tool 52. Then, a second a tool 54 (or plate), accurately positioned over these locations, may make the required impressions, that is, pressing the reflective material into the base at the desired slope to create facets 24 having a reflective surface 26. With proper registration of this latter tool over the spots of reflective medium, the impressions may be made without any run over of the medium onto walls, etc.

Figure 7:
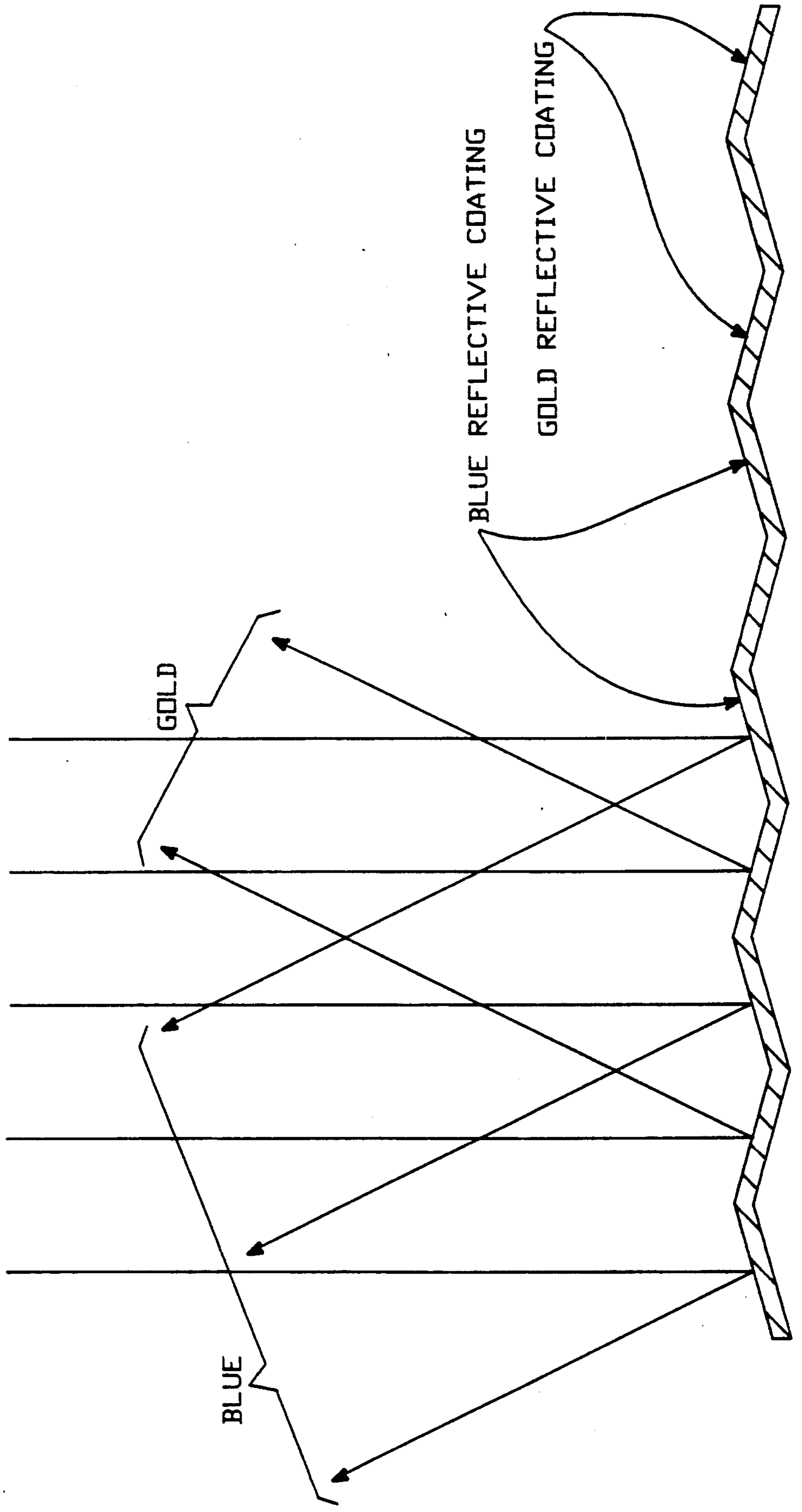
FIG. 7 illustrates a "shot silk" visual effect.

Another visual effect (see FIG. 7), not one which gives rise to a three-dimensional illusion, may also be achieved by controlling the slopes of highly reflective facets in an array. A "shot silk" effect, that is, where the color of a surface seems to change as a function of the viewing angle, can be easily achieved by alternating facets at different angles and having different colors of reflective surfaces alternate on these different-angles facets. Three or more different colors could be achieved if each had separate angles on alternating facets. In this case the 45 degree maximum slope, discussed above, would not apply since some or all of the different viewing angles required would necessarily be less than 90 degrees with respect to the base.

Although certain embodiments of the invention have been described herein in detail, the invention is not to be limited only to such embodiments, but rather only by the appended claims.

What is claimed is:

1. A system for producing an illusory three dimensional image comprising:
   an array of sections formed in a surface, each of said sections having facet means;
   a reflective medium formed on the facet means; and
   said facet means sloped in a predetermined way to have a slope corresponding to sections in a real or imagined three dimensional scene for creating an illusory three dimensional image that simulates the scene.

2. The system of claim 1 wherein the three-dimensional scene is a low-relief scene.

3. The system of claim 1 wherein said sections are disposed adjacent to one another but do not overlap.

4. The system of claim 3 wherein said facets are substantially flat.

5. The system of claim 4 wherein said reflective medium scatters incident light about 8 degrees or less from an angle of reflection.

6. The system of claim 1 wherein said surface is substantially flat.

7. The system of claim 1 wherein said surface is curved.

8. The system of claim 6 or 7 wherein said surface is substantially semi-rigid.

9. The system of claim 1 wherein said facets are formed by impressions in said surface.

10. The system of claim 9 wherein the walls of said impressions are curved.

11. The system of claim 1 wherein said facets are formed by protrusions on said surface.

12. The system of claim 11 wherein there is a gap formed between adjacent ones of said facets to increase the amount of light reflected by said reflective medium.

13. The system of claim 12 wherein the cross dimension of said gap is approximately equal to that of said facet.

14. The system of claim 1 wherein said facets are formed by a method selected from the group consisting of: stamping, molding, casting, etching, polishing, electroplating, painting, and vapor deposition.

15. The system of claim 1 wherein reflective media of different colors are applied to different facets such that facets of a given color reflect light at a particular viewing angle to create a "shot silk" effect.

16. A system for producing a visual effect, comprising:
   an array of adjacent sections formed in a surface, each of said sections having a facet;
   said facets sloped in a predetermined way to have a slope corresponding to sections in a real or imagined low-relief three-dimensional scene so as to create a predetermined illusory three-dimensional image that simulates the scene.

17. The system of claim 16 wherein said surface is substantially flat.

18. The system of claim 16 wherein said surface is curved.

19. A method for creating a visual effect, comprising:
   establishing on a surface an array of sections, each of said sections having a facet;
   applying a reflective medium to the facets;
   varying the slopes of the facets in a predetermined way to correspond to sections in a real or imagined three-dimensional object to simulate the object and create a predetermined illusory three-dimensional visual effect.

20. The method of claim 19 wherein reflective media of different colors are applied to different facets such that facets of a given color reflect light at a selected viewing angle to create a "shot silk" effect.

21. A method for forming a visual effect, comprising:
   partitioning a real or imagined three-dimensional scene into a two-dimensional, first array of first sections;
   determining the slope of said sections;
   forming a second array of second sections at a surface so that there is a correspondence between the size and location of said first sections and said second sections, each of said sections having a facet;
   forming on said facets a reflective medium; and
   varying the slopes of said facets so that there is a correspondence between the slopes of said facets and the slopes of said first sections to create an illusory three-dimensional image.

22. The method of claim 19 wherein said reflective medium scatters incident light about 8 degrees or less from an angle of reflection.

23. The method of claim 21 wherein said first and second sections are disposed adjacent to one another but do not overlap.

24. The method of claim 23 wherein said reflective medium scatters incident light about 8 degrees or less from an angle of reflection.

25. The method of claim 21 wherein the depth of said surface is not less than elevation of the maximal slope of said first sections.

26. The method of claim 21 wherein said facets are formed by impressions in said surface.

27. The method of claim 26 wherein walls of said second sections are curved.

28. The method of claim 21 wherein said facets are formed by protrusions on said surface.

29. The method of claim 28 wherein there is a gap formed between adjacent ones of said facets.

30. The method of claim 29 wherein the cross dimension of said gap is approximately equal to that of said facet.

31. The method of claim 21 including forming said facets by a method selected from the group consisting of: stamping, molding, casting, etching, polishing, electroplating, painting, and vapor deposition.

32. The method of claim 21 wherein said second sections are formed by building blocks of an architectural structure.

33. The method of claim 21 wherein said surface is a surface of a book cover or other printed object and said second sections are impressed on said surface.

34. The method of claim 21 wherein said reflective medium is formed on said facets by first applying said reflective medium to said surface at the required locations and then forming an impression in said surface where said reflective medium is located to form said facets.

35. The method of claim 21 wherein said surface is substantially flat.

36. The method of claim 21 wherein said surface is curved.

37. A system for producing an image on a surface comprising:

an array of sections on the surface, each of said sections having a facet;

a reflective medium on said facets;

said sections forming the image on said surface; and said facets sloped in a predetermined way to have a slope corresponding to a real or imagined three-dimensional object, such that the image appears to a viewer to be three dimensional.

38. A system for producing an image on a surface comprising:

an array of sections on the surface, each of said sections having a facet;

a reflective medium on said facets;

said sections forming the image on said surface; and said facets sloped in a predetermined way to have a slope corresponding to a real or imagined three-dimensional object, such that the image appears to a viewer to be three dimensional when viewed from different angles.

39. A system for producing an image on a surface, comprising:

an array of sections on the surface, each of said sections having a facet; said facets being reflective, but not sufficiently reflective to form a mirror-like surface;

said sections forming the image on said surface; and said facets sloped in a predetermined way to have a slope corresponding to sections in a real or imagined three dimensional object, whereby the image on the surface appears to a viewer to be a three dimensional image of said object.

* * * * *

UNITED STATES PATENT AND TRADEMARK OFFICE

CERTIFICATE OF CORRECTION

PATENT NO. : 5,105,306

DATED : April 14, 1992

INVENTOR(S) : Ohala

It is certified that error appears in the above-indentified patent and that said Letters Patent is hereby corrected as shown below:

Column 8, line 14,
Claim 19, line 4, after "facets;" insert --and--.
Column 8, line 28,
Claim 21, line 5, before "sections;" insert --first--.
Column 8,

Claim 22: delete the entire paragraph and insert --The method of Claim 21 wherein reflective media of different colors are applied to different facets such that facets of a given color reflect light at a particular viewing angle to create a "shot silk" effect.

Signed and Sealed this

Eighteenth Day of July, 1995

*Attest:*

BRUCE LEHMAN

*Attesting Officer* *Commissioner of Patents and Trademarks*